(12) United States Patent
Blankenship et al.

(10) Patent No.: US 8,507,826 B2
(45) Date of Patent: Aug. 13, 2013

(54) MICROPLASMA SPRAY APPARATUS AND METHOD FOR COATING ARTICLES USING SAME

(75) Inventors: Donn R. Blankenship, Southbury, CT (US); Paul H. Zajchowski, Enfield, CT (US); Gary C. Shubert, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 406 days.

(21) Appl. No.: 12/767,323

(22) Filed: Apr. 26, 2010

(65) Prior Publication Data

US 2010/0200549 A1    Aug. 12, 2010

Related U.S. Application Data

(63) Continuation of application No. 10/982,041, filed on Nov. 4, 2004, now abandoned.

(51) Int. Cl.
*B23K 10/00* (2006.01)

(52) U.S. Cl.
USPC ............ 219/121.47; 219/121.52; 219/75.16

(58) Field of Classification Search
CPC ........................................ B23K 10/00
USPC ............ 219/121.36, 121.5, 121.48, 121.51, 219/121.52, 75; 313/111.21, 111.31, 111.41
See application file for complete search history.

(56) References Cited

U.S. PATENT DOCUMENTS

| | | |
|---|---|---|
| 3,214,623 A | 10/1965 | Sheer |
| 3,708,409 A | 1/1973 | Bainbridge |
| 3,914,573 A | 10/1975 | Muehlberger |
| 4,121,083 A | 10/1978 | Smyth |
| 4,199,104 A | 4/1980 | Houben |
| 4,445,021 A | 4/1984 | Irons et al. |
| 4,594,496 A | 6/1986 | Bebber et al. |
| 4,674,683 A | 6/1987 | Fabel |
| 4,901,921 A | 2/1990 | Dallaire et al. |
| 4,916,273 A | 4/1990 | Browning |
| 5,109,150 A | 4/1992 | Rogers |
| 5,173,328 A | 12/1992 | Reiter et al. |
| 5,233,153 A | 8/1993 | Coats |
| 5,271,971 A | 12/1993 | Herb et al. |
| 5,285,967 A | 2/1994 | Weidman |
| 5,296,667 A | 3/1994 | Marantz et al. |
| 5,311,103 A | 5/1994 | Asmussen et al. |
| 5,408,066 A | 4/1995 | Trapani et al. |

(Continued)

FOREIGN PATENT DOCUMENTS

| | | |
|---|---|---|
| EP | 0342388 A2 | 11/1989 |
| EP | 1652952 A1 | 5/2006 |

(Continued)

OTHER PUBLICATIONS

EP Search Report for EP Patent Application No. 05256848.2, dated Sep. 28, 2007.

*Primary Examiner* — Mark Paschall

(74) *Attorney, Agent, or Firm* — Bachman & LaPointe, P.C.

(57) ABSTRACT

A microplasma spray coating apparatus includes a microplasma apparatus with an anode, cathode, and an arc generator for generating an electric arc between the anode and cathode. An arc gas emitter injects inert gas through the electric arc. The electric arc is operable for ionizing the gas to create a plasma gas stream. A powder injector nozzle extends through the anode and injects powdered material into the plasma stream for transfer to the workpiece.

18 Claims, 4 Drawing Sheets

(56) References Cited

U.S. PATENT DOCUMENTS

| | | | |
|---|---|---|---|
| 5,442,153 A | 8/1995 | Marantz et al. | |
| 5,560,779 A | 10/1996 | Knowles et al. | |
| 5,733,662 A | 3/1998 | Bogachek | |
| 5,770,273 A | 6/1998 | Offer et al. | |
| 6,121,569 A | 9/2000 | Miley et al. | |
| 6,191,381 B1 | 2/2001 | Kabir | |
| 6,238,540 B1 | 5/2001 | Timoshenko et al. | |
| 6,264,817 B1 | 7/2001 | Timoshenko et al. | |
| 6,268,583 B1 | 7/2001 | Yamaguchi et al. | |
| 6,424,091 B1 | 7/2002 | Sawada et al. | |
| 6,620,645 B2 | 9/2003 | Chandra et al. | |
| 6,703,579 B1 | 3/2004 | Rice | |
| 6,744,005 B1 | 6/2004 | Beyer et al. | |
| 7,026,009 B2 | 4/2006 | Lin et al. | |
| 2005/0015980 A1 | 1/2005 | Kottilingam et al. | |
| 2005/0069724 A1 | 3/2005 | Obara | |
| 2005/0133974 A1 | 6/2005 | Celikkaya et al. | |

FOREIGN PATENT DOCUMENTS

| | | |
|---|---|---|
| JP | 61210170 A | 9/1986 |
| RU | 2039613 C1 | 7/1995 |
| UA | 2002076032 | 7/2002 |
| WO | 01/88218 A1 | 11/2001 |

# MICROPLASMA SPRAY APPARATUS AND METHOD FOR COATING ARTICLES USING SAME

CROSS REFERENCE TO RELATED APPLICATION

This is a continuation of Ser. No. 10/982,041, filed Nov. 4, 2004 and entitled "Microplasma Spray Apparatus and Method for Coating Articles Using Same", the disclosure of which is incorporated by reference in its entirety herein as if set forth at length.

FIELD OF THE INVENTION

The present disclosure generally relates to a plasma spray coating apparatus, such as a microplasma spray coating apparatus, for spray coating a workpiece and a method for using the same.

BACKGROUND

Plasma coating methods and apparatus are known. For example, one such method and apparatus for plasma flame spray coating material onto a substrate by means of passing a plasma forming gas through a nozzle electrode, and passing an arc forming current between the nozzle electrode and a rear electrode to form a plasma effluent. The method includes introducing coating material into the plasma effluent, passing the plasma effluent axially through a wall shroud extending from the exit of said nozzle electrode, and forming a flame shroud for the plasma effluent. The coating is thereby applied to the substrate.

One area where such technology is particularly advantageous is in connection with coating various components, particularly aerospace components like gas turbine engines and their components. For example, the blade roots of compressor blades can be coated with material to meet dimensional tolerance requirements for sealing the compressor blade with the compressor wheel and the like. Metallic coatings consisting of copper-nickel, aluminum-copper, and other similar composition materials have been applied in this regard using various conventional plasma spray coating processes. Typically, the coating process requires the workpiece to be masked in areas where the material transfer is not required and/or not desired. Furthermore, the workpiece is typically coated in a dedicated facility such as a gas turbine engine manufacturing plant or repair shop. Prior art methods and apparatus required masking the workpiece and applying the coating in dedicated facilities because the coating equipment was large and not portable and the spray pattern was too wide to accurately control the coating process. It would be desirable to improve the accuracy of spray coating devices so that masking and the like would not be required, as well as permitting hand spray coating repairs in the field.

SUMMARY

In accordance with one aspect of the disclosure, a plasma spray apparatus for coating at least a portion of a workpiece such as a gas turbine compressor blade is provided. A plasma apparatus includes an anode, cathode, and an arc generator for generating an electric arc between the anode and cathode. The apparatus includes an arc gas emitter for injecting gas into the electric arc. The electric arc is operable for ionizing the gas to create a plasma gas stream. A powder feeder provides powdered material to the plasma apparatus. A powder injector nozzle is connected to the powder feeder via a conduit. The powder injector nozzle extends through the anode and is operable for injecting powdered material into the plasma gas stream.

In accordance with another aspect of the disclosure, a plasma spray apparatus for coating a portion of a workpiece such as a gas turbine compressor blade is provided. A plasma apparatus includes an anode, cathode, and an arc generator for generating an electric arc between the anode and cathode. The apparatus includes an arc gas emitter for injecting gas into the electric arc. The electric arc is operable for ionizing the gas to create a plasma gas stream. A powder feeder provides powdered material to the plasma apparatus. An electrode extending from a cathode housing and terminating at a tip includes a substantially circular cross section along at least a portion of a lengthwise axis. An angled surface extending from the tip toward the cathode housing is formed on the electrode. A substantially flat edge having a predetermined height defines a forward edge of the tip.

In accordance with another aspect of the present disclosure, a method for injecting powdered material into a plasma gas stream is provided. A powder injector nozzle is positioned through an anode in a plasma apparatus. Powdered material is transported from a powder hopper to the powder injector nozzle. The powdered material is injected into the plasma gas stream prior to being applied to a workpiece.

Other applications of the present invention will become apparent to those skilled in the art when the following description of the best mode contemplated for practicing the invention is read in conjunction with the accompanying drawings.

Figure 1:
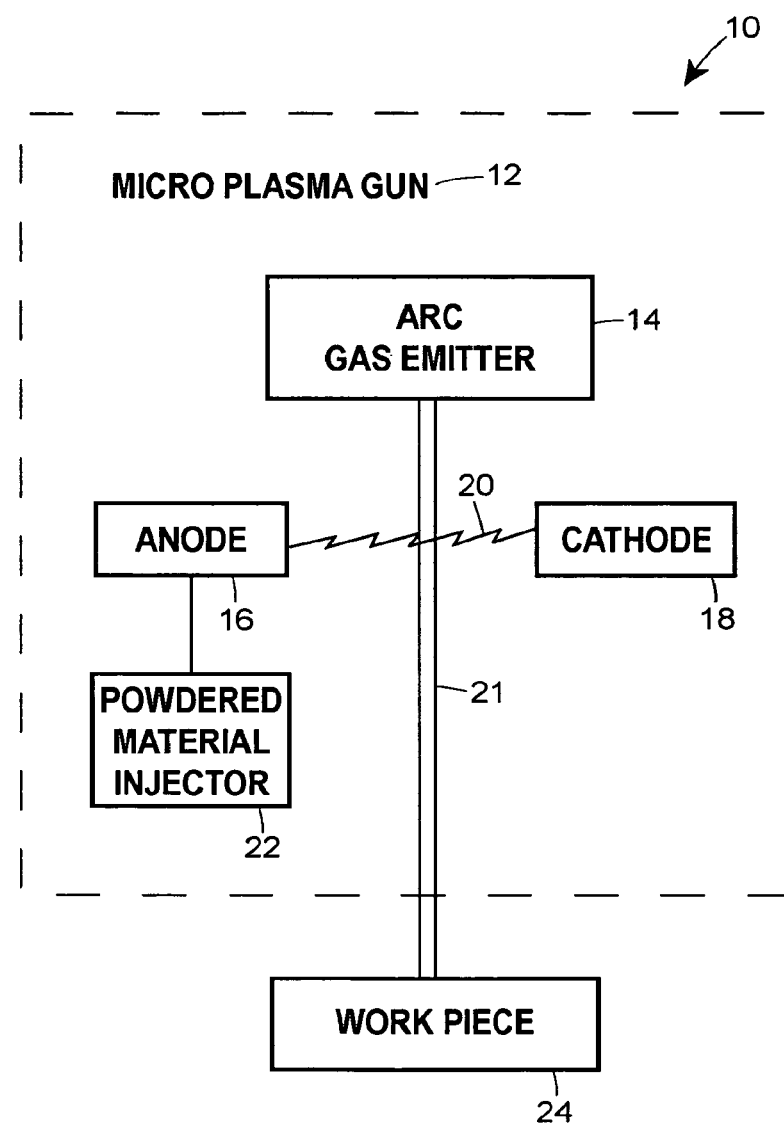
FIG. 1 is a schematic representing one embodiment of a microplasma spray apparatus and a workpiece of the present disclosure.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

Referring now to FIG. 1, one embodiment of a plasma spray apparatus 10 schematically represented by the dashed box outline is depicted. In generalized terms, the plasma spray apparatus 10 includes a plasma gun 12 having an arc gas emitter 14, an anode 16, and a cathode 18. An electric arc 20 is generated between the anode 16 and cathode 18. A plasma stream 21 is formed when arc gas is injected from the arc gas emitter 14 and passes through the arc 20. A powdered material injector 22 dispenses powdered material into the plasma stream which transports the powdered material to the workpiece 24 to form a coating thereon. The size of the plasma stream 21 created by the device and/or the power used by the device determines whether the device is considered a microplasma spray apparatus. When the plasma stream 21 is small and/or the power used by the device is low, the device is considered a microplasma spray device. FIG. 1 displays a microplasma spray device.

For example, the powdered material can form a solid coating with a thickness of approximately 0.0015 to 0.006 inches in a desired location on the workpiece 24. The coating material may be virtually any metallic, non-metallic or intermetallic powder, including the materials described above and ceramic-based materials.

In operation, an electric arc 20 is generated between the anode 16 and cathode 18 of the plasma gun 12. Arc gas such as, but not limited to argon, is emitted into the electric arc 20 formed between the anode 16 and the cathode 18. It should be understood that in practice the arc gas can be emitted prior to generating the electric arc. The electric arc 20 ionizes the gas to create the plasma gas stream 21. The ionization process removes electrons from the arc gas, causing the arc gas to become temporarily unstable. The arc gas heats up to approximately 20,000.degree. F. to 30,000.degree. F. as it re-stabilizes. The plasma stream cools rapidly after passing through the electric arc.

Figure 2:
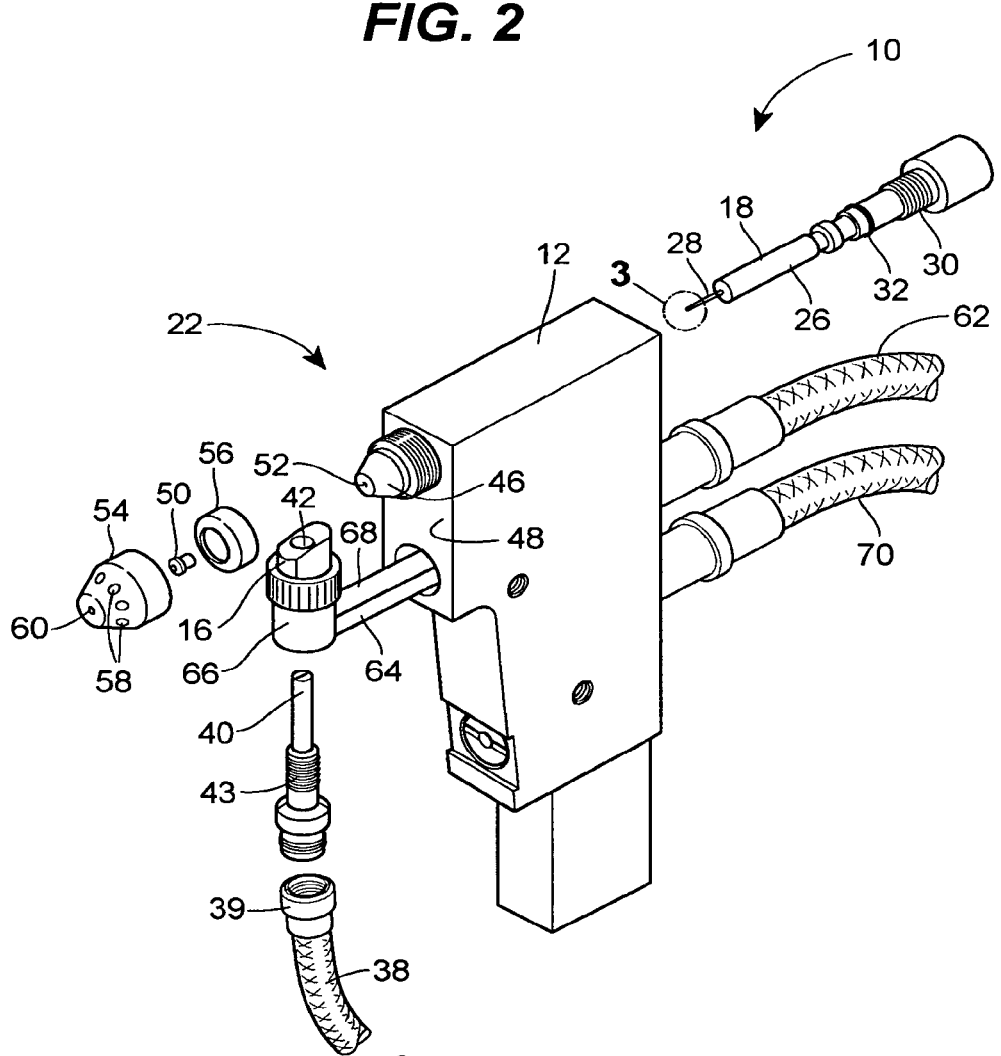
FIG. 2 is an exploded, perspective view of one embodiment of a microplasma spray apparatus constructed in accordance with the teachings of the disclosure.

While a number of different embodiments and structural variations can be constructed to practice such an invention, the following describes one possible embodiment. Referring now to FIG. 2, an exploded view of such a plasma spray apparatus is again referred to by reference numeral 10. As will be described in detail below, the plasma spray apparatus 10 is operable for coating a workpiece, including, but not limited to at least a portion of a compressor blade 72 in a gas turbine engine (See FIG. 4). However, it is to be understood that the teachings of disclosure can be used to coat myriad other surfaces, including those on aircraft, land-based vehicles, weapons, sea-faring vessels and the like.

In the depicted embodiment, the plasma spray apparatus 10 includes the aforementioned plasma gun 12 having an anode 16 and a cathode 18. The cathode 18 is further depicted to include an insulated body 26 with an electrode 28 extending therefrom. The cathode 18 can also include threads 30 for threadingly engaging the plasma gun 12. The cathode 18 can also include an O-ring seal 32 to seal the leak path that is created at the interface between the cathode 18 and the plasma gun 12.

A powdered material injector 22 injects powdered material 34 into the plasma gas stream 21. The powdered material 34 is heated and super plasticized in the plasma stream 21 and is deposited on the compressor blade 72 (see FIG. 4) where it cools and re-solidifies to form the coating. The powdered material injector 22 includes a powder hopper 36 for holding and feeding the powdered material 34 into the plasma stream 21. The hopper 36 can be connected to the plasma gun 12 through a conduit 38 such as a flexible hose or the like. The conduit 38 can be connected via a threaded fitting 39 to a powder injector nozzle 40. The powder injector nozzle 40 can extend through an aperture 42 formed in the anode 16. The powder injector nozzle 40 can threadingly connect to the anode 16 via threads 43.

Conventional anodes are typically formed from a copper-tungsten alloy and provide very limited service life of approximately 10 to 20 minutes in a plasma spray apparatus 10. Copper and other similar, metals have melting temperatures that are lower than the anode operating temperature. These metals can melt and cause the edge of the anode 16 to become molten and initiate cavitation erosion along an upper edge of the anode. In order to produce high quality coatings, the edge of the anode must remain relatively sharp. To achieve this, a commercially pure sintered tungsten material has been developed to produce a more robust anode. Test results using anodes made from sintered tungsten material has shown marked improvements in the erosion resistance over prior art anodes. Utilizing commercially pure tungsten in the anode 16 has increased the service life of the anode 16 to approximately between 10 and 20 hours.

A nozzle shroud 46 positioned on a forward wall 48 of the plasma gun 12 holds a nozzle insert 50 and permits the electrode 28 to extend through a center aperture 52 formed in the nozzle shroud 46. The nozzle insert 50 can be threadingly attached to an end of the nozzle shroud 46. A shield gas cap 54 is positioned over the nozzle shroud 46. An insulator 56 is positioned between the shield gas cap 54 and the nozzle shroud 46 to electrically isolate the shield gas cap 54 from the nozzle shroud 46. The shield gas cap 54 can be pressed fit onto the nozzle shroud 46 and over the insulator 56. The shield gas cap 54 includes a plurality of through apertures 58 for permitting shield gas to flow therethrough and shield the arc gas from ambient atmosphere. A center aperture 60 formed in the shield gas cap 54 permits high velocity arc gas to pass through and into the electric arc.

Cooling fluid, such as water or the like, can be utilized to cool the plasma gun 12. The cooling fluid is delivered to the plasma gun 12 via a cooling fluid hose 62. The cooling fluid traverses through internal passages (not shown) in the plasma gun 12 and flows through an inlet passage 64, into an anode holder 66 and back through an outlet passage 68. The cooling fluid reduces the temperature of the anode 16 during operation of the plasma gun 12. The cooling flow rate may be approximately 1.0-1.5 gallons per minute. A second conduit 70 can be connected to the plasma gun 12. The second conduit may be operable for providing electrical power, arc gas, and/or shield gas to the plasma gun 12.

Figure 3:
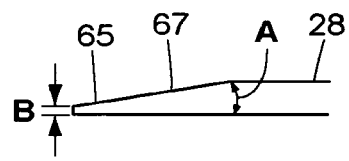
FIG. 3 is an enlarged view of an electrode depicted in FIG. 2.

Referring now to FIG. 3, the electrode 28 of the cathode 18 is shown in an enlarged view. The electrode 28 can have a circular cross-section, for example, of approximately 1/16.sup.th inch in diameter, although other dimensions are certainly possible. The electrode 28 can include a tip 65 that is tapered, for example, by machining at an angle A to form a substantially flat upper surface 67. The angle A can range between 0 and 90 degrees, but in one embodiment the angle A ranges between approximately 8 and 10 degrees. A distal end of the tip 65 can then be machined flat to a desired height B. In one embodiment the height B can range from 0.008 to 0.010 inches. For variably sized electrodes, the height B can be defined as approximately between 10% and 20% of a diameter or a width of the electrode. The electrode can be formed from any electrically conductive material such as a copper alloy, but has been found to be advantageously formed from thoriated tungsten.

Figure 4:
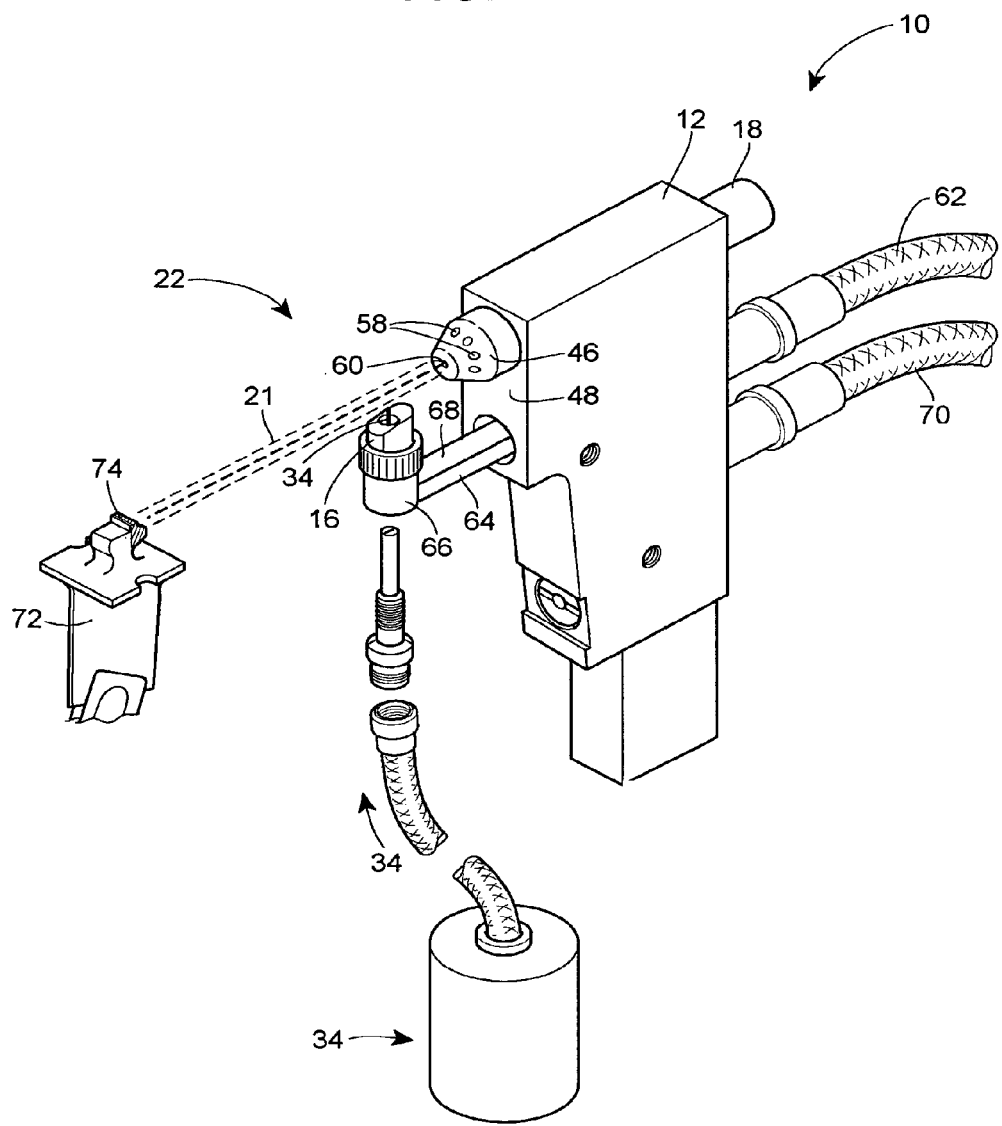
FIG. 4 is an assembled perspective view of the microplasma spray apparatus of FIG. 1, applying a coating to a workpiece.

Referring now to FIG. 4, it is shown that a localized area of the compressor blade 72, such as a blade root 74, can be spray coated with powdered material 34. The plasma gas stream 21 is directed toward the portion of the compressor blade 72 to be coated. The plasma gun 12 is operated at a relatively low power range of between approximately 0.5 Kilowatts and 2.5 Kilowatts. The low power output of the plasma gun 12 significantly reduces the heat flow into the compressor blade 72 over that of conventional coating methods. The maximum surface temperature of the compressor blade 72 caused by the coating process is approximately 200.degree. F. Such low power output and resulting low temperature on blade 72 allows the plasma gun 12 to apply powdered material 34 to a thin wall area of the compressor blade 72 without distorting the compressor blade 72 because the localized stresses caused by high thermal gradients do not exist.

The plasma gun 12 can apply coating material in narrow strips of, for example, approximately 2 mm in width. This permits accurate surface coating even with a hand held device. The narrow strips of coating substantially eliminate the need for masking or otherwise covering the compressor blade 72 in areas where the coating is unwanted. The narrow spray pattern is controlled by the nozzle opening size. The hand held version of the plasma gun 12 can spray coatings on components even while they remain in an installed condition, such as in an engine or the like.

The arc gas flow rate of the plasma apparatus 10 may be between approximately 1.5 and 3 liters per minute, although other rates are certain possible. As stated above, the arc gas and shield gas are typically argon, but any suitable inert gas can be utilized as is known to those skilled in the art. The shield gas flow rate could range between approximately 2 and 4 liters per minute for a typical application.

The powder hopper 36 holds the powdered material 34 prior to being injected into the plasma gas stream 21 by the powder injector 22. Powdered material 34 can be transferred to the workpiece from between approximately 1 to 30 grams per minute. The plasma gun 12 can typically apply the coating from distances ranging from approximately 1.5 inches to 6.5 inches to the workpiece, but can vary depending on the coating application requirements. The plasma spray gun 12 provides unlimited angles of orientation relative to the workpiece because the pressurized powder feed system uses carrier gas to entrain and deliver the powdered material 34 to the plasma-stream 21 and does not rely on gravitation as prior art systems did.

Compressed carrier gas, such as an inert gas; flows through the powder injector 22. Powdered material 34 can be entrained with the carrier gas as is known to those skilled in the art. The carrier gas will flow through the powder injector 22 at any angle of orientation and thus does not rely on gravitational forces to deliver powdered material 34 to the plasma stream 21. The plasma stream 21 provides a venturi effect with respect to the powder injector 22. The high velocity flow rate of the plasma stream 21 across the powder injector 22 generates a low pressure region which augments the flow rate of the carrier gas and the powdered material 34 through the powder injector 22.

The plasma spray gun 12 generates a relatively low noise level that ranges from between 40 and 70 decibels due to the low power output, thereby making the apparatus 10 suitable for hand held application. Current U.S. government regulations require hearing protection when environmental noise reaches 85 decibels. The plasma spray apparatus 10 can be hand held or alternatively held in a fixture (not shown) such as one that is computer controlled.

In one embodiment, a residual amount of electric current is transmitted from the anode 16 to the powder injector 22. This residual current can cause preheating of the powdered material 34 to occur which facilitates softening of the powdered material 34 prior to entering the plasma stream 21.

Figure 5:
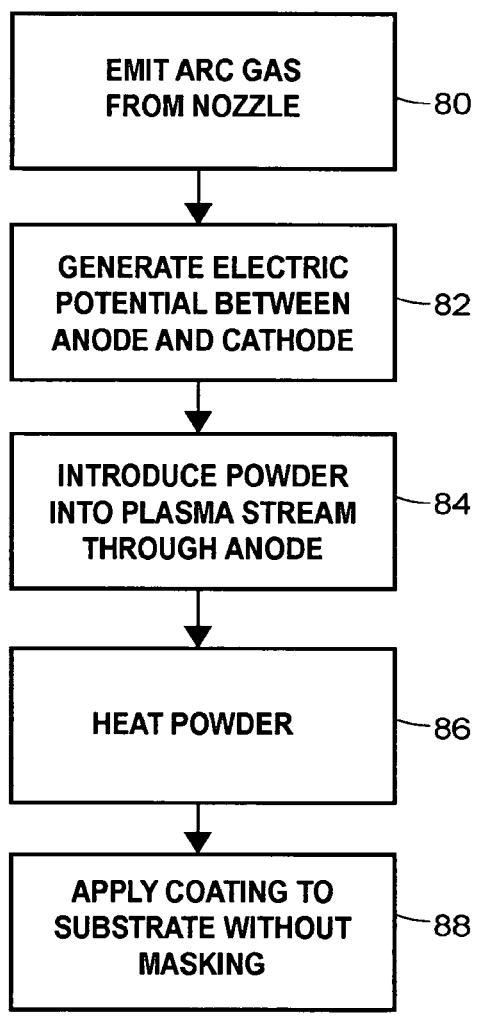
FIG. 5 is a flowchart describing one embodiment of a process for plasma spray coating a workpiece.

Referring now to FIG. 5, a block diagram generally describing the operation of the plasma spray apparatus 10 and the plasma spray coating process is illustrated. Initially, at block 80, arc gas is emitted from the nozzle insert 50. An electric potential is generated between the anode 16 and the cathode 18 of the plasma spray gun 12 and is directed through the arc gas as described in block 82. Arc gas is directed through the electric potential to create the plasma stream 21.

At block 84, powdered material 34 is injected into the plasma stream 21. At block 86, the plasma stream heats the powdered material 34 to a "super plasticized" condition such that the powdered material 34 is malleable when it is applied to a workpiece. At block 88, the powdered material 34 is applied to an unmasked. Substrate. The powdered material 34 then cools and solidifies as a hard coating on the substrate.

While the preceding text sets forth a detailed description of certain embodiments of the invention, it should be understood that the legal scope of the invention is defined by the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A plasma spray apparatus for coating a workpiece, comprising:
    an anode, a cathode, and an arc generator generating an electric arc between the anode and cathode;
    a nozzle to emit arc gas into the electric arc, the electric arc operable for ionizing the gas to create a plasma gas stream; a powder hopper for holding the powdered material prior to the powdered material being injected into the plasma gas stream;
    a feeder extending through the anode to provide powdered material into the plasma gas stream, wherein the feeder uses a carrier gas to entrain the powdered material through a powder injector nozzle.

2. The plasma spray apparatus of claim 1, wherein the plasma spray apparatus is a microplasma spray apparatus.

3. The plasma spray apparatus of claim 1, wherein the powder hopper and feeder are combined in one apparatus.

4. The plasma spray apparatus of claim 1, wherein the cathode includes an electrode having a first end extending from a cathode housing and a second end terminating at a tip, the electrode operable for conducting electric current.

5. The plasma spray apparatus of claim 4, wherein the electrode includes a substantially circular cross section along at least a portion of a lengthwise axis.

6. The plasma spray apparatus of claim 4, wherein the electrode is formed with a desired surface angle extending from the tip toward the cathode housing.

7. The plasma spray apparatus of claim 6, wherein the angle is approximately 10 degrees.

8. The plasma spray apparatus of claim 4, wherein the tip includes a substantially flat forward edge.

9. The plasma spray apparatus of claim 8, wherein the flat forward edge of the tip is formed at a desired height.

10. The plasma spray apparatus of claim 9, wherein the height of the edge is approximately between 10% and 20% of a width of the electrode.

11. The plasma spray apparatus of claim 1, wherein a maximum surface temperature of the workpiece caused by the coating process is approximately 200° F.

12. The plasma spray apparatus of claim 1, wherein the plasma apparatus applies the coating material in widths of approximately 2 mm to the workpiece.

13. The plasma spray apparatus of claim 1, wherein the anode is formed from sintered tungsten material.

14. The plasma spray apparatus of claim 1, further including a shield gas cap having shielding gas injected therethrough.

15. The plasma spray apparatus of claim 1, wherein the powdered material is a metal alloy.

16. The plasma spray apparatus of claim 1, wherein the powdered material is a ceramic based coating.

17. The plasma spray apparatus of claim 1, further including a cooling system for cooling the plasma apparatus.

18. The plasma spray apparatus of claim 1, wherein the plasma apparatus is operable for spray coating a workpiece at any angle of orientation.

* * * * *